Nov. 30, 1965  A. E. FEUERSANGER  3,220,880
METHOD OF MAKING TITANIUM DIOXIDE CAPACITORS
Filed Aug. 24, 1962  2 Sheets-Sheet 1

INVENTOR
ALFRED E. FEUERSANGER
BY
R. J. Frank
ATTORNEY

INVENTOR
ALFRED E. FEUERSANGER

United States Patent Office 3,220,880
Patented Nov. 30, 1965

3,220,880
METHOD OF MAKING TITANIUM DIOXIDE CAPACITORS
Alfred E. Feuersanger, Flushing, N.Y., assignor to General Telephone and Electronics Laboratories, Inc., a corporation of Delaware
Filed Aug. 24, 1962, Ser. No. 219,163
12 Claims. (Cl. 117—213)

This invention relates to capacitors and in particular to a method of producing thin film titanium dioxide capacitors.

Capacitors which have relatively large values of capacitance, small volume and now losses are required in the fabrication of miniature and sub-miniature electrical circuts. Such capacitors may be produced by applying a thin film of a material having a high dielectric constant on a metal or semi-conducting substrate and then depositing a metal electrode over the dielectric film. The dielectric constant and the thickness of the film determine the capacitance-to-volume ratio; the ratio increasing as the dielectric constant is increased and as the thickness of the dielectric film is decreased. The minimum thickness of the film is determined principally by the maximum value of the conduction losses which can be tolerated for a given application. Such losses are functions of the film material, its purity and the breakdown voltage of the film.

Titanium dioxide is well suited for use as the dielectric film in capacitors. In bulk, it has a dielectric constant of about 100 and exhibits low temperature and frequency dependence. When a titanium dioxide film is deposited on a metal substrate, the capacitance of the resulting device is independent of the value of the applied voltage. When the film is deposited on a semiconductor substrate, the capacitance of the resulting device varies as some function of the value of the applied voltage.

Various methods have been employed for depositing titanium dioxide on substrates to form capacitors. In one such method, the film is formed by anodic oxidation of titanium metal in an electrolyte consisting, for example, of an aqueous solution of oxalic acid and ethyl alcohol. However, this method can only be used to form a film on a titanium substrate and therefore is not suitable for producing a voltage-variable capacitor. Further, the titanium substrate must be extremely clean to obtain adherence to the titanium dioxide film making manufacture of a capacitor by this process somewhat difficult.

Another known method of producing titanium dioxide layers is by the direct oxidation of titanium metal in oxygen at temperatures above 400° C. This method also has the disadvantage that the titanium dioxide layer can only be formed on titanium metal. In addition, the high temperature required makes it difficult to use on printed circuit boards since adjacent components may be damaged by excessive heat.

Attempts have also been made to obtain titanium dioxide layers by the evaporation or sputtering of pure titanium dioxide bulk material in vacuum. However, during evaporation the titanium dioxide decomposes, partially forming conducting suboxides which render the resulting film unsuitable for use in a capacitor.

Accordingly it is an object of my invention to provide an improved method of making titanium dioxide capacitors.

Another object is to provide a method of making either fixed or voltage-variable titanium dioxide capacitors.

Still another object is to provide a method of producing capacitors which have a high ratio of capacitance-to-volume and low losses.

Yet another object is to provide a method of making titanium dioxide films having excellent dielectric properties, uniformity, hardness and good adherence to metal or semi-conductor substrates.

A further object is to provide an improved method of making thin film capacitors which is suitable for use with printed circuit assemblies.

In the present invention a thin film titanium dioxide capacitor is prepared by reacting first and second gas components to form a titanium dioxide film as a reaction product on the surface of a metal or semiconductor substrate. A metal layer is then deposited on the titanium dioxide film. The first gas component comprises titanium tetrachloride and the second component comprises water vapor. Both the titanium tetrachloride and the water vapor are mixed prior to the reaction with a gas carrier consisting of oxygen or nitrogen. The formation of a stoichiometric titanium dioxide film depends principally upon the vapor pressures of the titanium tetrachloride and water in the vessels and upon the flow rate of the gas through the vessels.

The above objects of and the brief introduction to the present invention will be more fully understood and further objects and advantages will become more apparent from a study of the following description in connection with the drawings wherein.

Figure 1A:
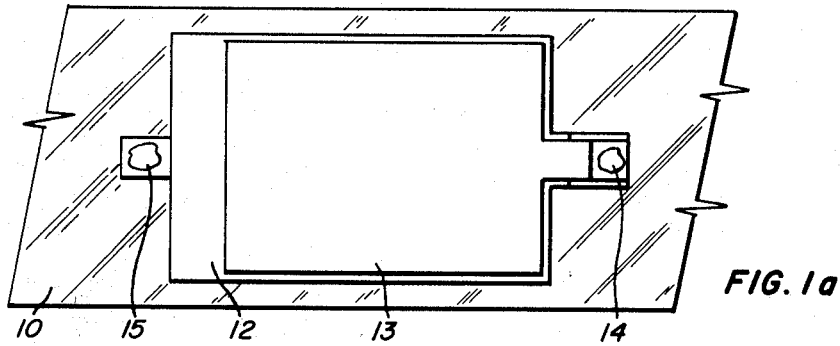
FIGS. 1a and 1b are plan and elevation views respectively of a thin film capacitor made in accordance with my invention.
Figure 1B:
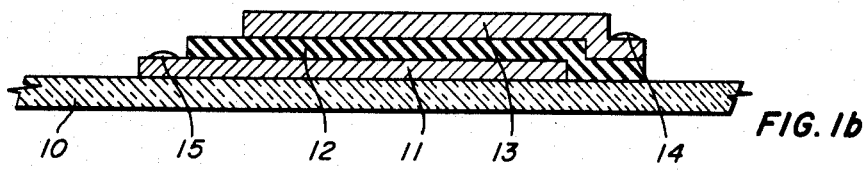

Referring to FIGS. 1a and 1b, there is shown a thin film capacitor comprising a silicon borate glass insulating circuit base 10, a substrate 11 affixed to the base 10, a thin film 12 of titanium dioxide deposited on substrate 11 by the method to be disclosed hereinafter, and a metal layer 13 evaporated onto film 12. Electrical connections are made to the capacitor by electrode 14 which is affixed to one end of layer 13 and electrode 15 which is secured to substrate 11.

Figure 2:
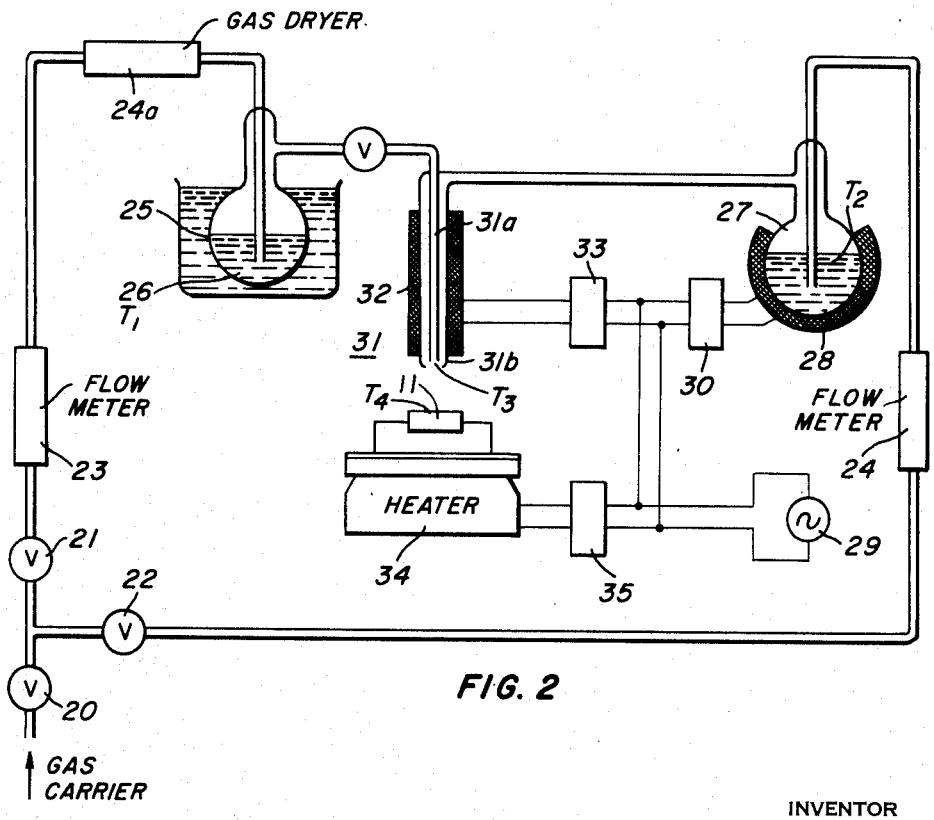
FIG. 2 is a schematic diagram of the apparatus for depositing the titanium dioxide films.

When the capacitance of the capacitor is to have a constant value regardless of the value of the voltage across it, substrate 11 is formed of a metal such as aluminum, nickel, titanium, zirconium, molybdenum, tantalum, platinum, or 304 stainless steel. The titanium dioxide film 12 is deposited on substrate 11 using the apparatus shown schematically in FIG. 2.

In this apparatus, oxygen or nitrogen gas is introduced through a valve 20 and flows through valves 21 and 22 to flowmeters 23 and 24 respectively. The gas flowing through valve 21 and flowmeter 23 is dried in a gas dryer 24a and then introduced into a vessel 25 containing titanium tetrachloride. The vessel 25 is immersed in a bath 26 containing methyl alcohol and dry ice to maintain the titanium tetrachloride at a constant low temperature $T_1$. The gas flowing through valve 22 and flowmeter 24 is passed through a vessel 27 containing water held at a constant temperature $T_2$ by heating mantle 28, mantle 28 being energized by voltage source 29 through a regulator 30. The gas containing the titanium tetrachloride and water vapor reactants are next heated while traveling throuh a quartz nozzle 31, nozzle 31 being held at a temperature $T_3$ by the current through a heating tape 32 controlled by regulator 33. Nozzle 31 comprises an inner tube 31a and an outer tube 31b for conducting the carrier gases containing the titanium tetrachloride and water vapor respectively. At the outlet of nozzle 31 the gases are reacted to form titanium dioxide which is then deposited on the surface of the metal substrate 11. Substrate 11 is maintained at a temperature $T_4$ by a heating unit 34 regulated by controller 35.

As has been mentioned, the formation of a stoichiometric titanium dioxide film having the desired characteristics is dependent upon the vapor pressures of the titanium tetrachloride and water in vessels 25 and 27 respectively and upon the flow ratio of the gas through the vessels. The vapor pressure is determined by the temperature of the reactants in vessels 25 and 27 and upon the pressure in the vessels.

The flow rate $F_1$ of gas through flowmeter 23 is in the range 0.1 to 0.8 liter per minute and the flow rate $F_2$ of gas through meter 24 is in the range 1.2 to 1.7 liters per minute. The temperature $T_1$ of the titanium tetrachloride and temperature $T_2$ of the water are maintained in the range $-5°$ to $15°$ C. and $35°$ to $60°$ C. respectively. The temperature $T_3$ of the quartz nozzle is held at approximately $160°$ C. and the substrate temperature $T_4$ in the range $130°$ to $400°$ C. Since the flow rates are relatively low, the pressure is substantially equal to atmospheric pressure.

With $F_1=0.2$ liter per minute, $F_2=1.5$ liters per minute, $T_1=5°$ C., $T_2=40°$ C., $T_3=160°$ C., and $T_4=130°$ C., the film deposition rate is of the order of 2400 Angstroms per minute. When the substrate temperature $T_4$ is increased to $400°$ C., the deposition rate decreases to about 25 Angstroms per minute. After deposition of the titanium dioxide film, layer 13 is applied by vacuum deposition of a metal such as gold, silver or aluminum. The thickness range of the titanium dioxide layers in typical capacitors is between 1000 and 2000 Angstroms. Typical electrical properties are as follows:

Dielectric constant _____ 30–62.
Dissipation factor (measured at 1 kilocycle) _____ 2–5%.
Capacitance _____ 0.34 microfarad per square centimeter.
D.C. resistivity _____ $10^{12}$–$10^{13}$ ohm-centimeter.
Insulation resistance _____ 50 ohm-farads.
Breakdown field _____ $7.5 \times 10^5$ volts per centimeter.

The yield of the capacitors fabricated by this method was found to vary consistently between 80 and 100 percent indicating a very low density of pinholes in the films. Multiple layer capacitors may also be formed by my method by depositing alternate titanium dioxide and metal layers on the substrate.

If the substrate 11 is a semiconductor such as silicon or germanium, a voltage-variable capacitor is obtained. This is because the capacitance is a function of the density of the space charge at the surface of the semiconductor which, in turn, varies with the magnitude of the electric field normal to the surface. With a metal substrate on the other hand, there is substantially no space charge at the surface and therefore a fixed capacitance is obtained.

A voltage-variable capacitor having the desired characteristics was made using n-type single crystal germanium having a resistivity of approximately 0.2 ohm-centimeter. The surface of the germanium was first prepared to reduce the density of surface states to a minimum in order to maximize the capacitance change due to the space charge region. This was achieved by polishing the surface of the germanium thereby distorting the crystal lattice and then removing the mechanically damaged layer by converting it to water soluble germanium oxide. This procedure leaves the surface flat in contrast to methods using chemical dissolution of the damaged layers such as etching. The detailed procedure for treating the semiconductor surface is as follows:

The surface is first polished to a 0.25 micron finish with diamond powder. It is then thoroughly degreased with trichloroethylene, acetone, and a final rinse in low conductivity water. Next, the sample is dried and exposed to a flow of wet oxygen at a rate of 1.5 liters per minute at $550°$ C. for two hours. After cooling to room temperature, the oxide layer is removed with low conductivity water and the titanium dioxide layer deposited to the desired thickness in the manner described for the metal substrate. A gold layer is then evaporated on to the film.

Figure 3:
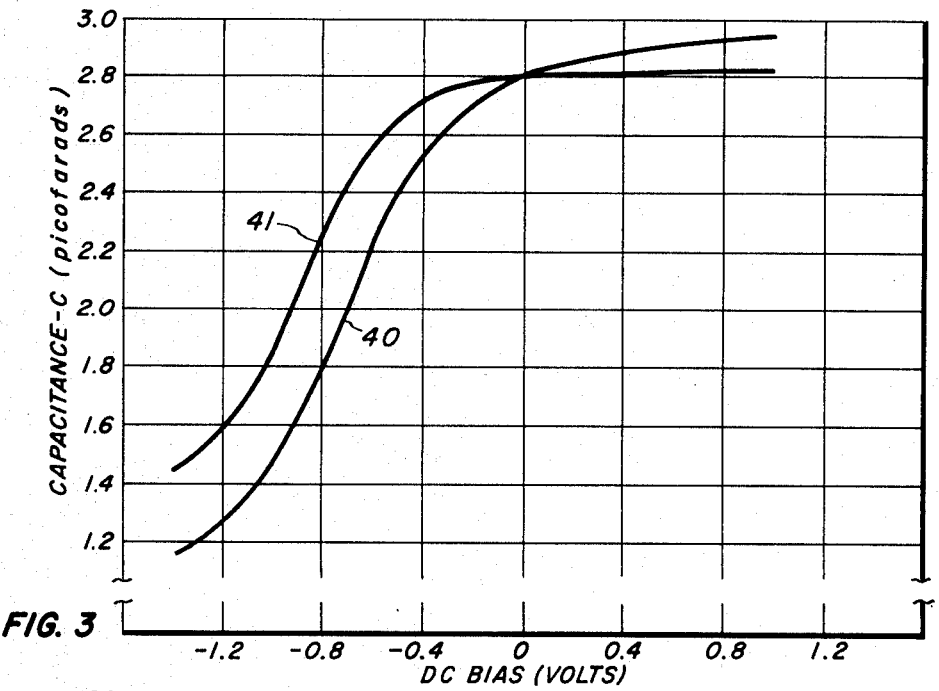
FIGS. 3 and 4 depict curves illustrating the characteristics of capacitors made in accordance with my method in which the titanium dioxide films are deposited in semiconductor substrates.

For high frequency applications of the voltage-variable capacitor, the size of the metal layer 13 is reduced to an area of about $3.4 \times 10^{-5}$ centimeters. This is achieved by evaporating a 66 micron diameter gold dot on to the titanium dioxide film and then contacting the dot with a pointed gold whisker. Plots of the capacitance versus D.C. bias voltage for superimposed 20 millivolt A.C. signals having frequencies of 1 and 1000 megacycles per second are shown at 40 and 41 respectively of FIG. 3. The substrate of this capacitor is composed of n-type germanium having a resistivity of 0.20 ohm-centimeter and the titanium dioxide layer is 1100 Angstroms thick. At one megacycle, the ratio of the maximum to minimum capacitance is approximately 2.5 and the maximum quality factor Q measured at 0.3 volt D.C. is 180. (Quality factor is defined as the ratio of the average energy stored in the capacitor during one half cycle of the A.C. signal to the energy dissipated during that interval.)

Still smaller contact areas can be achieved by a direct contact of the whisker on the film. In addition to reducing the area of the metal layer, the thickness of the semiconductor substrate must be reduced as far as possible (to about 1000 Angstroms) to provide minimum series resistance loss. This is achieved by using epitaxial semiconductor layers. A maximum cut-off frequency of 370 kilomegacycles has been obtained with these devices.

Figure 4:
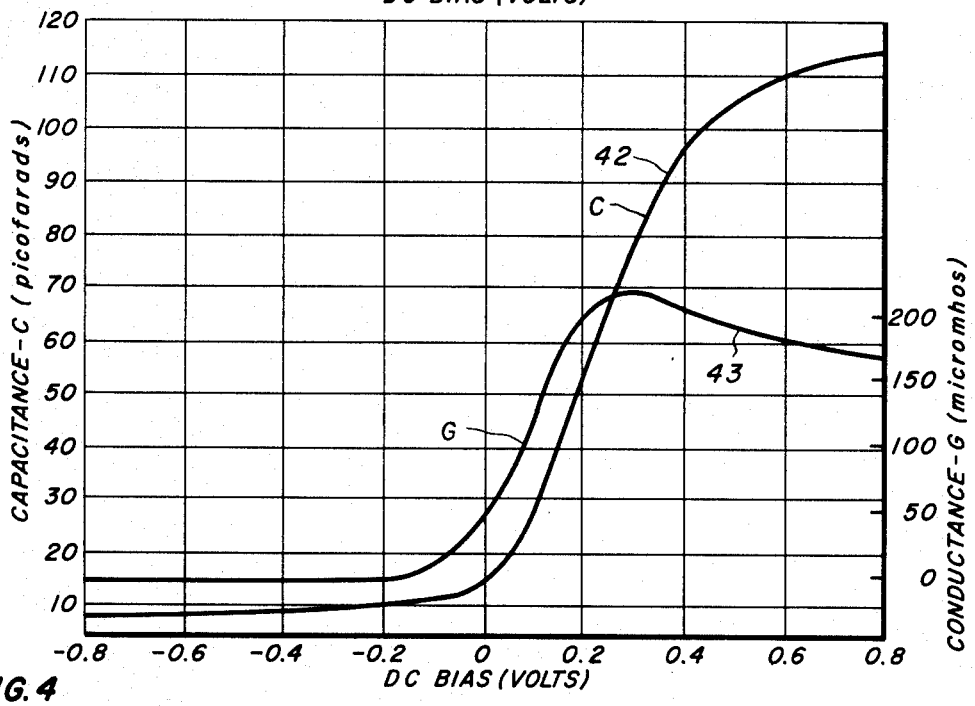

Curves 42 and 43 of FIG. 4 illustrate the changes in capacitance and conductance respectively with change in D.C. bias voltage for a silicon substrate capacitor operated with a superimposed 20 millivolt A.C. signal having a frequency of one megacycle per second. The substrate is n-type silicon having a resistivity of 30 ohm-centimeters, the titanium dioxide film is 1100 Angstroms thick and layer 13 is formed of a gold dot having an area of $5.0 \times 10^{-4}$ square centimeters. The ratio of maximum to minimum capacitances is 14.5 and the quality factor at 0.3 volt D.C. is 2.33.

As many changes could be made in the above construction and many different embodiments could be made without departing from the scope thereof it is intended that all matter contained in the above description or shown in the accompanying drawings shall be interpreted as illustrative and not in a limiting sense.

What is claimed is:
1. The method of making a titanium dioxide capacitor comprising the steps of
 (a) mixing titanium tetrachloride with a gas carrier to form a first gas component having a temperature in the range $-5°$ to $+15°$ C.,
 (b) mixing water with said gas carrier to form a second gas component having a temperature in the range $35°$ to $60°$ C.,
 (c) reacting said first and second gas components in the presence of a substrate to form a thin titanium dioxide film on the surface thereof, said substrate having a temperature in the range $130°$ to $400°$ C., and
 (d) depositing a metal layer on said titanium dioxide film.

2. The method of making a titanium dioxide capacitor comprising the steps of
 (a) mixing titanium tetrachloride with a gas carrier to form a first gas component having a temperature in the range $-5°$ to $+15°$ C.,
 (b) mixing water with said gas carrier to form a second gas component having a temperature in the range $35°$ to $60°$ C.,
 (c) reacting said first and second gas components at a temperature of approximately $160°$ C., (d) depositing the product of the reaction of said first and second gas components on a substrate having a temperature in the range 130° to 400° C., said reaction product forming a thin film of titanium dioxide on the surface of said substrate, and (e) depositing a metal layer on said titanium dioxide film.

3. The method of making a titanium dioxide capacitor comprising the steps of (a) mixing titanium tetrachloride with a gas carrier to form a first gas component having a temperature in the range −5° to +15° C., (b) mixing water with said gas carrier to form a second gas component having a temperature in the range 35° to 60° C., (c) reacting said first and second gas components in the presence of a metallic substrate to form a thin titanium dioxide film on the surface thereof, said metallic substrate having a temperature in the range 130° to 400° C., and (d) depositing a metal layer on said titanium dioxide film.

4. The method of making a titanium dioxide capacitor comprising the steps of (a) mixing titanium tetrachloride with a gas carrier to form a first gas component having a temperature in the range −5° to +15° C., (b) mixing water with said gas carrier to form a second gas component having a temperature in the range 35° to 60° C., (c) reacting said first and second gas components in the presence of a semiconductor substrate to form a thin titanium dioxide film on the surface thereof, said semiconductor substrate having a temperature in the range 130° to 400° C., and (d) depositing a metal layer on said titanium dioxide film.

5. The method of making a titanium dioxide capacitor comprising the steps of (a) mixing titanium tetrachloride with a gas carrier to form a first gas component having a temperature in the range −5° to +15° C., the flow rate of said first gas carrier being in the range 0.1 to 0.8 liter per minute, (b) mixing water with said gas carrier to form a second gas component having a temperature in the range 35° to 60° C., the flow rate of said first gas carrier being in the range 1.2 to 1.7 liters per minute, (c) reacting said first and second gas components in the presence of a substrate to form a thin titanium dioxide film on the surface thereof, said substrate having a temperature in the range 130° to 400° C., and (d) depositing a metal layer on said titanium dioxide film.

6. The method of making a titanium dioxide capacitor comprising the steps of (a) mixing titanium tetrachloride with a gas carrier to form a first gas component having a temperature of 5° C., the flow rate of said first gas carrier being 0.2 liter per minute, (b) mixing water with said gas carrier to form a second gas component having a temperature of 40° C., the flow rate of said second gas carrier being 1.5 liters per minute, (c) reacting said first and second gas components in the presence of a substrate to form a thin titanium dioxide film on the surface thereof, said substrate having a temperature in the range 130° to 400° C., and (d) depositing a metal layer on said titanium dioxide film.

7. The method of preparing a titanium dioxide capacitor as defined in claim 6 wherein the temperature of said substrate is 130° C.

8. The method of preparing a titanium dioxide capacitor as defined in claim 6 wherein the temperature of said substrate is 400° C.

9. The method of making a titanium dioxide capacitor comprising the steps of (a) preparing the surface of a semiconductor substrate to reduce the density of surface states to a minimum, (b) mixing titanium tetrachloride with a gas carrier to form a first gas component having a temperature in the range −5° to +15° C., (c) mixing water with said gas carrier to form a second gas component having a temperature in the range 35° to 60° C., (d) heating said semiconductor substrate to a temperature in the range 130° to 400° C., (e) reacting said first and second gas components in the presence of said semiconductor substrate to form a thin titanium dioxide film on the surface thereof, and (f) depositing a metal layer on said titanium dioxide film.

10. The method of making a titanium dioxide capacitor as defined by claim 9 wherein said gas carrier is oxygen.

11. The method of making a titanium dioxide capacitor as defined by claim 9 wherein said gas carrier is nitrogen.

12. The method of making a titanium dioxide capacitor comprising the steps of (a) polishing the surface of a semiconductor substrate, (b) exposing the surface of said substrate to a flow of wet oxygen to form a water soluble germanium oxide layer, (c) cooling said substrate to room temperature, (d) removing said germanium oxide layer, the density of surface states on said semiconductor substrate being thereby reduced to a minimum, (e) mixing titanium tetrachloride with a gas carrier to form a first gas component having a temperature in the range −5° to +15° C., (f) mixing water with said gas carrier to form a second gas component having a temperature in the range 35° to 60° C., (g) heating said semiconductor substrate to a temperature in the range 130° to 400° C., (h) reacting said first and second gas components in the presence of said semiconductor substrate to form a thin titanium dioxide film on the surface thereof, and (i) depositing a metal layer on said titanium dioxide film.

References Cited by the Examiner

UNITED STATES PATENTS

| | | | |
|---|---|---|---|
| 2,709,765 | 5/1955 | Koller | 117—106 |
| 2,732,313 | 1/1956 | Cusano et al. | 117—106 |
| 2,759,854 | 8/1956 | Kilby | 117—217 |
| 2,982,668 | 5/1961 | Gunther et al. | 117—106 |
| 3,014,815 | 12/1961 | Lely et al. | 117—106 |

FOREIGN PATENTS

| | | |
|---|---|---|
| 1,029,941 | 5/1958 | Germany. |
| 1,120,023 | 12/1961 | Germany. |

OTHER REFERENCES

Powell et al.: "Vapor Plating," 1955, John Wiley and Sons, N.Y., pp. 136 and 137 relied on.

RICHARD D. NEVIUS, *Primary Examiner.*